United States Patent [19]

Eitai et al.

[11] Patent Number: 5,800,137
[45] Date of Patent: Sep. 1, 1998

[54] REFRIGERATING COMPRESSOR WITH BREAKAWAY PULLEY PORTION

[75] Inventors: Kazuo Eitai; Minoru Kanaizuka; Hiroyuki Ishida; Shuzo Kumagai, all of Kounan-machi; Tadashi Kobayashi, Higashimatsuyama, all of Japan

[73] Assignee: Zexel Corporation, Tokyo, Japan

[21] Appl. No.: 645,145

[22] Filed: May 13, 1996

[30] Foreign Application Priority Data

May 25, 1995 [JP] Japan ................................ 7-151037

[51] Int. Cl.$^6$ .................................. F04B 9/00; F16D 09/08
[52] U.S. Cl. ............................ 417/319; 464/32; 403/2
[58] Field of Search ............................ 417/319, 362, 417/364; 464/30, 32, 43, 37, 41, 45; 474/94, 197, 902, 903; 403/2

[56] References Cited

U.S. PATENT DOCUMENTS

| | | | |
|---|---|---|---|
| 3,472,046 | 10/1969 | Potter | 464/32 |
| 4,621,982 | 11/1986 | Schulz et al. | 417/319 X |
| 4,859,156 | 8/1989 | Kikuchi | 417/319 |
| 4,932,280 | 6/1990 | Becker et al. | 464/32 X |
| 5,443,372 | 8/1995 | Kanoll | 417/319 |
| 5,470,118 | 11/1995 | Burton | 403/2 X |

FOREIGN PATENT DOCUMENTS 6-336979  12/1994  Japan .

*Primary Examiner*—Ismael Izaguirre
*Attorney, Agent, or Firm*—Frishauf, Holtz, Goodman, Langer & Chick

[57] ABSTRACT

A refrigerant compressor includes a drive shaft, a pulley fixedly fitted on the drive shaft, over which is passed a torque-transmitting member for transmitting torque from an external drive source to the drive shaft, and a compression rotational member mounted on the drive shaft for rotation in unison with the drive shaft to enable compression of a refrigerant gas. The pulley has a rim in the form of a hollow cylinder, over which is passed the torque-transmitting member, a boss which is fixedly fitted on the drive shaft, and a support member connecting the rim and the boss. A breakaway portion is provided in the support member or the drive shaft for breaking to disconnect the torque-transmitting member from the compression rotational member when a load torque larger than a predetermined value is applied to the breakaway portion. A bearing is arranged on the pulley for receiving tension of the torque-transmitting member to thereby maintain the rim in a rotating state when the torque-transmitting member is disconnected from the compression rotational member by breaking of the breakaway portion.

15 Claims, 10 Drawing Sheets

REFRIGERATING COMPRESSOR WITH BREAKAWAY PULLEY PORTION

BACKGROUND OF THE INVENTION

1. Field of the Invention

This invention relates to a refrigerant compressor which dispenses with an electromagnetic clutch.

2. Description of the Prior Art

Recently, to reduce the size of an engine room, auxiliary machines of an engine, such as an alternator, an oil pump, and a refrigerating compressor, tends to be driven by means of a single belt. A refrigerant compressor which dispenses with an electromagnetic clutch can be said to contribute to reduction of the size of the engine room, compared with a compressor using an electromagnetic clutch. A refrigerant compressor of this kind has been proposed by Japanese Laid-Open Patent Publication (Kokai) No. 6-336979.

FIG. 1 shows part of a conventional swash plate refrigerant compressor as disclosed in the publication, on an enlarged scale. A pulley 233 is fixed to a front-side end of a drive shaft 207 by means of a bolt 217, and a belt 215 is passed over the pulley 233. Torque of an engine is transmitted via the belt 215 to the pulley 233 to cause rotation of the drive shaft 207.

The belt 215 is used for driving not only the swash plate refrigerant compressor but also the auxiliary machines of the engine, such as an alternator and an oil pump. Therefore, in case the swash plate refrigerant compressor is disabled from rotation due to seizure between shoes and a swash plate of the compressor, the other auxiliary machines become unable to function or the belt 215 burns due to heat generated through sliding on the pulley 233, which can lead to a fire of an automotive vehicle on which the engine and its auxiliary machines including the compressor are installed.

SUMMARY OF THE INVENTION

It is an object of the invention to provide a refrigerant compressor which does not impair the functions of other auxiliary machines of an engine and is capable of preventing occurrence of a fire of an automotive vehicle on which the engine is installed, when the refrigerant compressor is disabled from rotation.

To attain the above object, according to a first aspect of the invention, there is provided a refrigerant compressor including a drive shaft, a pulley fixedly fitted on the drive shaft, over which is passed a torque-transmitting member for transmitting torque from an external drive source to the drive shaft, and a compression rotational member mounted on the drive shaft for rotation in unison with the drive shaft to enable compression of a refrigerant gas. The pulley has a rim in the form of a hollow cylinder, over which is passed the torque-transmitting member, a boss which is fixedly fitted on the drive shaft, and a support member connecting the rim and the boss.

The refrigerant compressor according to the first aspect of the invention is characterized by comprising a breakaway portion provided in the support member for breaking to disconnect the torque-transmitting member from the compression rotational member when a load torque larger than a predetermined value is applied to the breakaway portion, and a bearing arranged on the pulley for receiving tension of the torque-transmitting member to thereby hold the rim in a rotating state when the torque-transmitting member is disconnected from the compression rotational member by breaking of the breakaway portion.

According to the refrigerant compressor of the first aspect of the invention, when the compression rotational member is disabled from rotation, the breakaway portion of the pulley breaks to disconnect the torque-transmitting member from the compression rotational member. On the other hand, the rim of the pulley continues to rotate on the bearing, whereby it is possible to prevent the functions of the other auxiliary machines driven via the torque-transmitting member, such as an alternator and an oil pump, from being impaired. Further, the torque-transmitting member is prevented from generating heat through friction with the pulley, which makes it possible to prevent the torque-transmitting member from being burnt to develop a fire of a vehicle on which the external drive source and the compressor are installed.

Preferably, the support member of the pulley is in the form of a disk, the breakaway portion being formed by forming a plurality of through holes in the support member of the pulley along an imaginary circle about the drive shaft at predetermined spaced intervals.

Further preferably, each of the plurality of through holes is a slot extending along the imaginary circle.

Alternatively, the support member of the pulley is in the form of a disk, the breakaway portion being formed by forming an annular groove on the support member of the pulley along an imaginary circle about the drive shaft.

Alternatively, the support member of the pulley is in the form of a disk, the breakaway portion being formed by forming an annular groove on the support member of the pulley along an imaginary circle about the drive shaft, and forming a plurality of through holes in the groove at predetermined spaced intervals.

Alternatively, the support member of the pulley comprises a rim-side plate part formed in one piece with the rim and a boss-side plate part formed in one piece with the boss, the breakaway portion being formed of a resilient material and connecting the rim-side plate part and the boss-side plate part.

According to this preferred embodiment, vibrations due to variation in compression load become hard to be transmitted to the torque-transmitting member, and hence it is possible to suppress adverse effects of irregularly-changing tensions of the torque-transmitting member on the other auxiliary machines of the engine, whereby it is possible to effectively reduce noise generated by the vehicle.

In one preferred form of the first aspect of the invention, the refrigerant compressor includes a compressor casing having a boss facing toward the pulley, the bearing being arranged between an inner peripheral surface of the rim and an outer peripheral surface of the boss of the compressor casing.

In another preferred form of the first aspect of the invention, the refrigerant compressor includes a compressor casing having a boss facing toward the pulley, the support member of the pulley having a hollow cylindrical part formed outward of the imaginary circle in a manner concentric with the boss of the pulley, the bearing being arranged between an inner peripheral surface of the boss of the compressor casing and an outer peripheral surface of the hollow cylindrical part of the support member of the pulley.

According to this preferred form, since the support member of the pulley has the hollow cylindrical part formed outward of the imaginary circle in a manner concentric with the boss of the pulley, and the bearing is arranged between the inner peripheral surface of the boss of the compressor casing and the outer peripheral surface of the hollow cylindrical part of the support member of the pulley, it is possible to employ a bearing which is small in diameter as the bearing. Further, since the circumferential speed of the bearing becomes low, it is possible to employ a bearing which is low in grade as the bearing, which contributes to reduction of manufacturing costs of the compressor.

In still another preferred form of the first aspect of the invention, the support member of the pulley has a hollow cylindrical part formed outward of the imaginary circle in a manner concentric with the boss of the pulley, the bearing being arranged between an inner peripheral surface of the hollow cylindrical part of the support member of the pulley and an outer peripheral surface of the boss of the pulley.

According to this preferred form of the invention, normally, the bearing does not perform its function but it starts to operate only after the breakaway portion on the imaginary circle has broken. Therefore, it is possible to use a bearing having a small diameter, and hence the circumferential speed of the bearing becomes small, which makes it possible to employ a bearing low in grade as the bearing, thereby reducing manufacturing costs of the compressor.

To attain the above object, according to a second aspect of the invention, there is provided a refrigerant compressor characterized by comprising a breakaway portion provided in the drive shaft for breaking to disconnect the torque-transmitting member from the compression rotational member when a load torque larger than a predetermined value is applied to the breakaway portion, and a bearing arranged on the pulley for receiving tension of the torque-transmitting member to thereby hold the rim in a rotating state when the torque-transmitting member is disconnected from the compression rotational member by breaking of the breakaway portion.

According to the refrigerant compressor of the second aspect of the invention, when the compression rotational member is disabled from rotation, the breakaway portion of the drive shaft breaks to disconnect the torque-transmitting member from the compression rotational member. On the other hand, the rim of the pulley continues to rotate on the bearing, and hence it is possible to prevent the functions of the other auxiliary machines driven via the torque-transmitting member, such as an alternator and an oil pump, from being impaired. Further, the torque-transmitting member is prevented from generating heat through friction with the pulley, which makes it possible to prevent the torque-transmitting member from being burnt to develop a fire of a vehicle on which the external drive source and the compressor are installed. Moreover, since the pulley is not damaged, it can be used again, which contributes to reduction of cost in replacement of the compressor.

Preferably, the breakaway portion is a neck formed in a pulley-side end of the drive shaft.

According to this preferred embodiment, when the compression rotational member is disabled from rotation, the neck of the drive shaft breaks.

Further preferably, the refrigerant compressor includes a compressor casing having a boss facing toward the pulley, the bearing being arranged between an inner peripheral surface of the boss of the compressor casing and an outer peripheral surface of the boss of the pulley.

According to this preferred embodiment, since the bearing is arranged between the inner peripheral surface of the boss of the compressor casing and the outer peripheral surface of the boss of the pulley, it is possible to employ a bearing which is small in diameter. Accordingly, the circumferential speed of the bearing becomes low, and hence it is possible to employ a bearing lower in grade as the bearing, which contributes to reduction of manufacturing costs of the compressor.

The above and other objects, features and advantages of the present invention will become more apparent from the following detailed description taken in conjunction with accompanying drawings.

DETAILED DESCRIPTION OF THE PREFERRED EMBODIMENTS

The invention will now be described in detail with reference to drawings showing preferred embodiments thereof.

Figure 1:
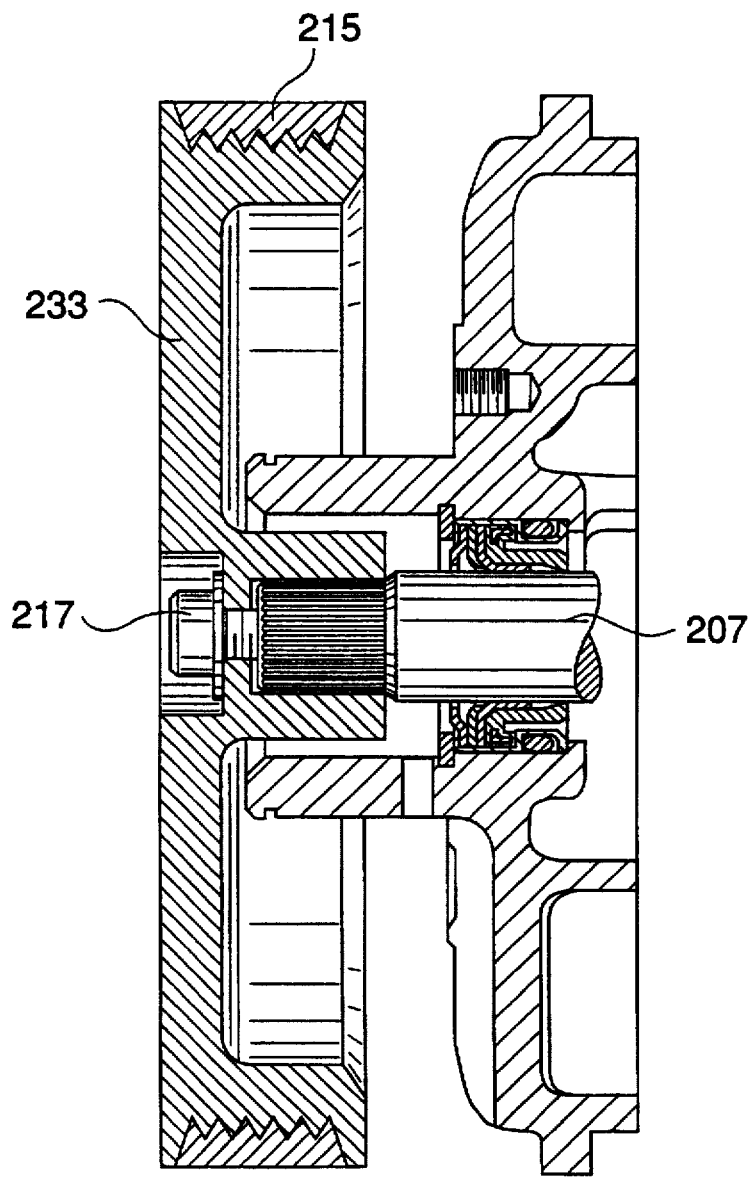
FIG. 1 is an enlarged sectional view showing part of a conventional swash plate refrigerant compressor.
Figure 2:
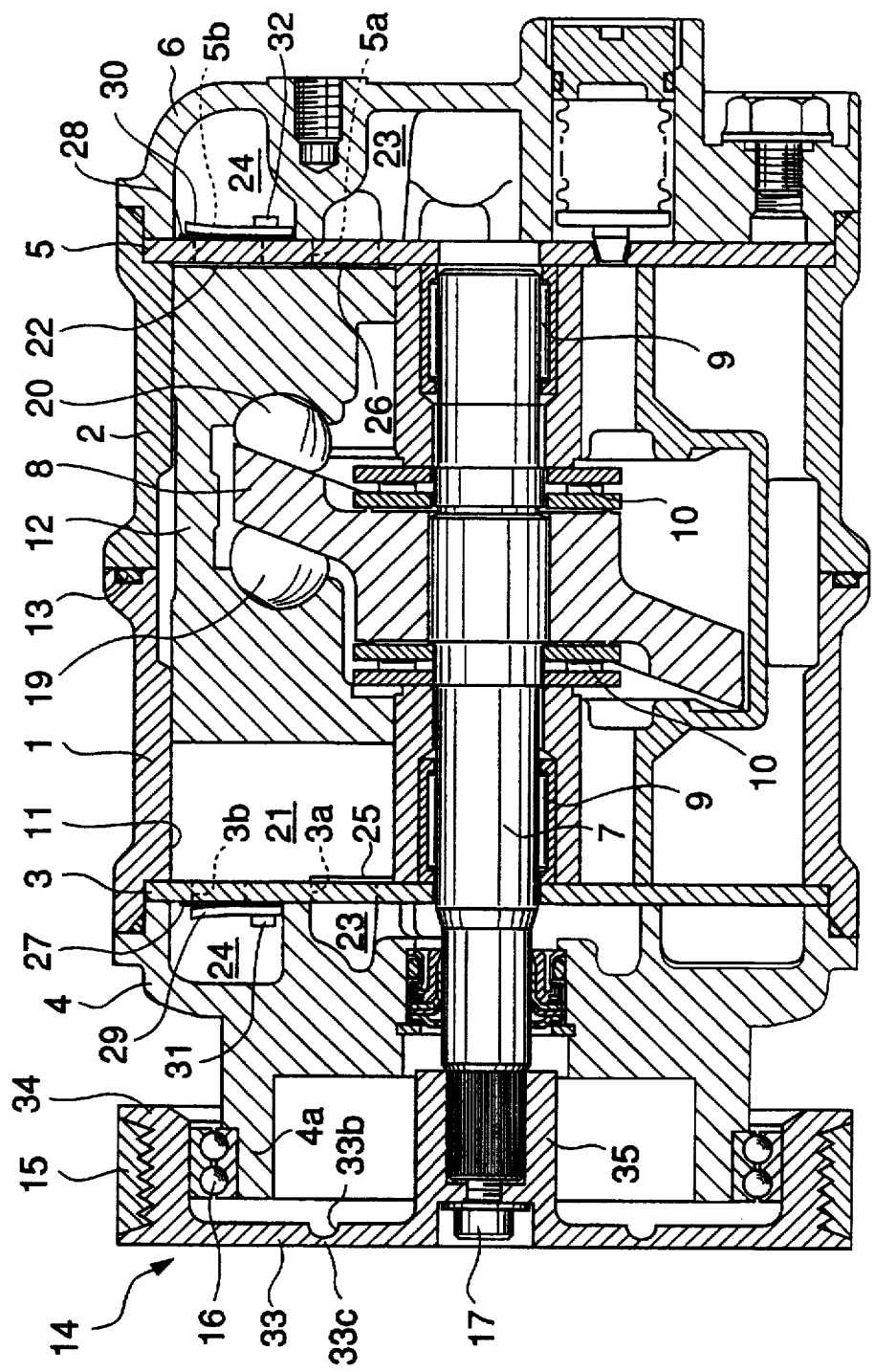
FIG. 2 is a longitudinal sectional view showing the whole arrangement of a swash plate refrigerant compressor according to a first embodiment of the invention.

Referring first to FIG. 2, there is shown the whole arrangement of a swash plate compressor according to a first embodiment of the invention.

The compressor has a cylinder block 1 on a front side, and a cylinder block 2 on a rear side, with respective opposed ends joined to each other via an O ring 13 to form a combined cylinder block 1,2. The combined cylinder block 1,2 has one end thereof secured to a front head 4 via a valve plate 3, and the other end thereof secured to a rear head 6 via a valve plate 5.

A drive shaft 7 extends through the center of the combined cylinder block 1,2, and a swash plate 8 is rigidly fitted on the drive shaft 7. The drive shaft 7 and the swash plate 8 are rotatably supported in the cylinder block via bearings 9, 10.

The combined cylinder block 1,2 has a plurality of cylinder bores 11 formed therethrough. Each cylinder bore 11 is parallel to the axis of the drive shaft 7, and arranged at predetermined circumferentially-spaced intervals around the drive shaft 7. The cylinder bore 11 has a piston 12 slidably received therein. Within each cylinder bore 11, compression chambers 21, 22 are formed on opposite ends of the piston 12. The piston 12 is connected to the swash plate 8 via shoes 19, 20, whereby the piston 12 reciprocates within the cylinder bore 11 according to rotation of the swash plate 8.

The valve plates 3,5 are formed with suction ports $3a$, $5a$ and discharge ports $3b$, $5b$. The compression chambers 21, 22 communicate with suction chamber 23 via the suction ports 3a, 5a, and with the discharge chamber 24 via the discharge ports 3b, 5b. Suction valves 25, 26 are arranged on one side of the valve plates 3,5 for opening and closing the discharge ports 3b, 5b, while discharge valves 27, 28 are fixed to the other side of the valve plates 3, 5 by rivets 31, 32 for opening and closing the discharge ports 3b, 5b together with stoppers 29, 30 for setting a proper limit to resilient deformation of each of the discharge valves 27, 28.

Figure 3:
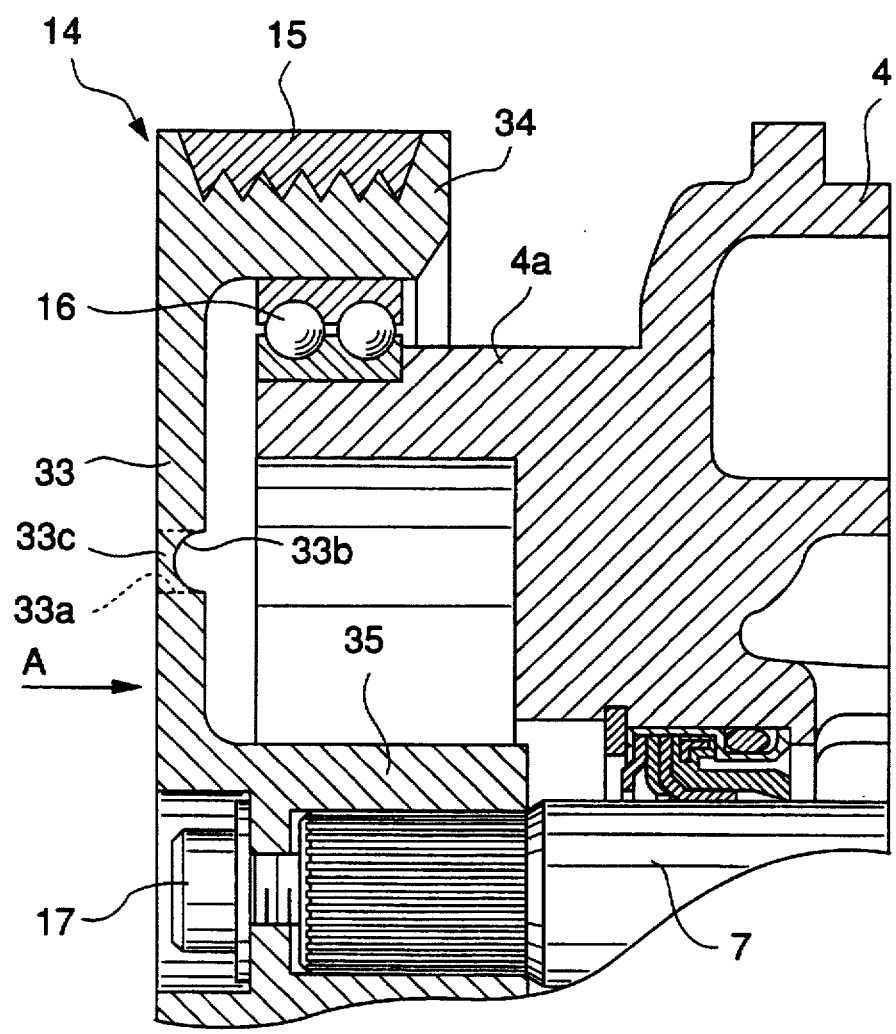
FIG. 3 is an enlarged sectional view showing part of the FIG. 2 swash plate refrigerant compressor.
Figure 4:
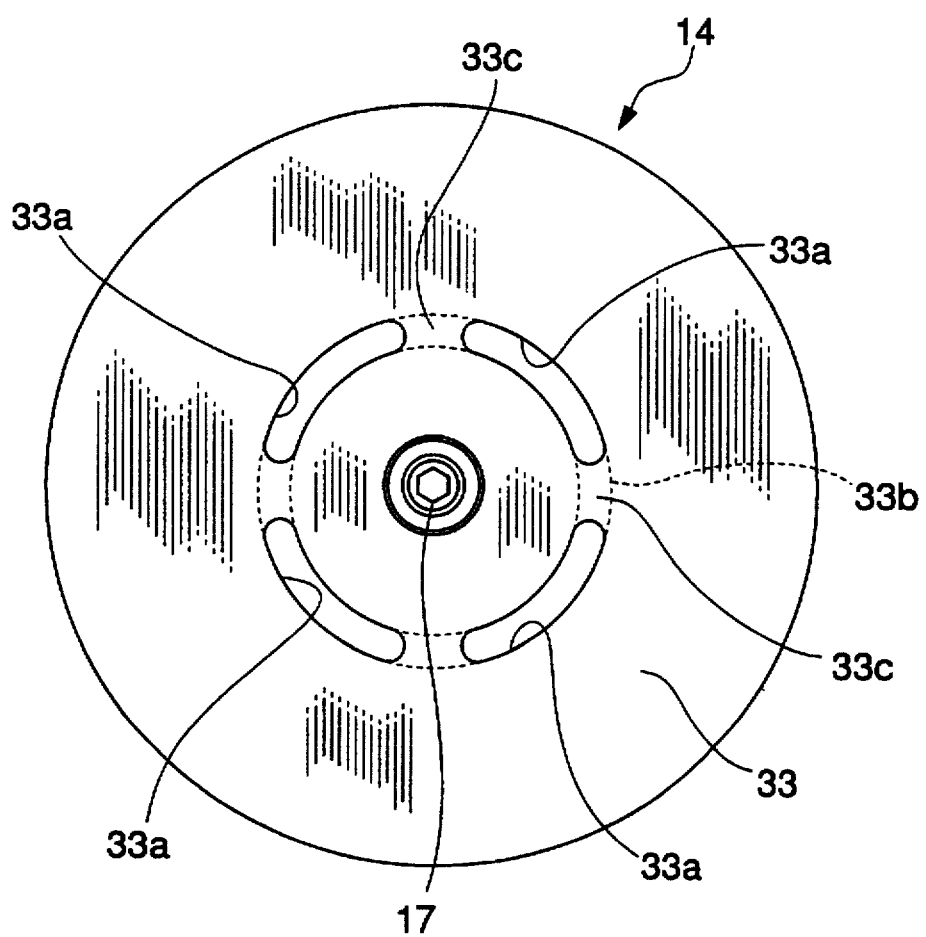
FIG. 4 is an end view of a pulley, as seen in the direction of arrow A in FIG. 3.

FIG. 3 shows part of the FIG. 2 swash plate refrigerant compressor on enlarged scale, and FIG. 4 shows an end face of a pulley 14 appearing in FIG. 3 as viewed from a direction indicated by an arrow A in FIG. 3.

The pulley 14 is fixed to a front-side end of the drive shaft 7 by means of a bolt 17. The pulley 14 has a disk 33, a rim 34 in the form of a hollow cylinder formed in one piece with the disk 33 along the periphery thereof, and a boss 35 in the form of a hollow cylinder formed in one piece with the disk 33 in a central part thereof.

A belt 15 is passed over the outer peripheral surface of the rim 34 for transmission of torque from an engine, not shown. The belt 15 also transmits the torque to auxiliary machines, such as an alternator and an oil pump, received within an engine room, not shown, of the engine. Arranged between an inner peripheral surface of the rim 34 of the pulley 14 and an outer peripheral surface of a boss 4a in the form of a hollow cylinder 4a of the front head 4 is a radial bearing 16 for rotatably supporting the rim 34 of the pulley 14.

The boss 35 of the pulley 14 is splined to a front-side end of the drive shaft 7.

A front head-side end face of the disk 33 of the pulley 14 is formed with a groove 33b along an imaginary circle about the drive shaft 7, and a plurality of slots 33a (see FIG. 4) are formed in the groove 33b to form breakaway portions 33c each between adjacent ones of the slots 33a. The thickness of each breakaway portion 33c (or depth of the groove 33b) and the circumferential length of each slot 33a, are set to such values as will permit the breakaway portions 33c to break when a torque load larger than a predetermined value is applied to these breakaway portions.

Next, the operation of the swash plate compressor according to the present invention will be described.

As the drive shaft 7 rotates, the swash plate 8 is rotated in unison therewith. The swash plate 8 is inclined with respect to a plane perpendicular to the longitudinal axis of the drive shaft 7, whereby the piston 12 linearly reciprocates within the cylinder bore 11 according to the rotation of the drive shaft 7. When the swash plate 8 turns by one half-turn from a position in which the piston 12 is closest to the valve plate 3 (left limit of travel as viewed in FIG. 2), i.e. the piston 12 is in a top dead center position within the compression chamber 21, the piston is moved to a position shown in FIG. 2 (right limit of travel as viewed in FIG. 2), whereby the suction stroke is completely carried out for the compression chamber 21 and the compression stroke is completely carried out for the compression chamber 22. From this position, when the swash plate 8 further turns by one half-turn, inversely, the suction stroke is completely carried out for the compression chamber 22 and the compression stroke is completely carried out for the compression chamber 21.

During the suction stroke, the suction valve 25 or 26 opens to introduce refrigerant gas via the suction port 3a or 5a into the compression chamber 21 or 22. During the compression stroke, refrigerant gas compressed within the compression chamber 21 or 22 forces the discharge valve 27 or 28 to open, whereby the high-pressure refrigerant gas is discharged from the compression chamber 21 or 22 via the discharge port 3b or 5b into the discharge chamber 24.

For example, in case seizure between the shoes 19, 20 and the swash plate 8 disables the swash plate refrigerant compressor from rotation, the load torque applied to the breakaway portions 33c of the disk 33 increases. When the load torque exceeds the predetermined value, the breakaway portions 33c break to disconnect the belt 15 from the drive shaft 7.

On the other hand, since the rim 34 of the pulley 14 is rotatable supported on the peripheral surface of the boss 4a of the front head 4 via the radial bearing 16, as described hereinabove, the rim 34 of the pulley 34 continues to rotate even after the drive shaft 7 is disabled from rotation to cause the breakaway portions 33c to break. Therefore, the functions of the auxiliary machines other than the compressor, such as the alternator and the oil pump, are not impaired, and the friction sliding of the belt 15 on the rim 34 of the pulley 14 is prevented, so that no heat is generated to burn the belt to develop a fire of the vehicle on which the engine and the compressor are installed.

If a rotational speed sensor is mounted on the swash plate refrigerant compressor and an indication lamp connected to the sensor is arranged in a compartment of the vehicle for indicating the state of rotation of the compressor, the driver can recognize an abnormality of the compressor with ease.

Figure 5:
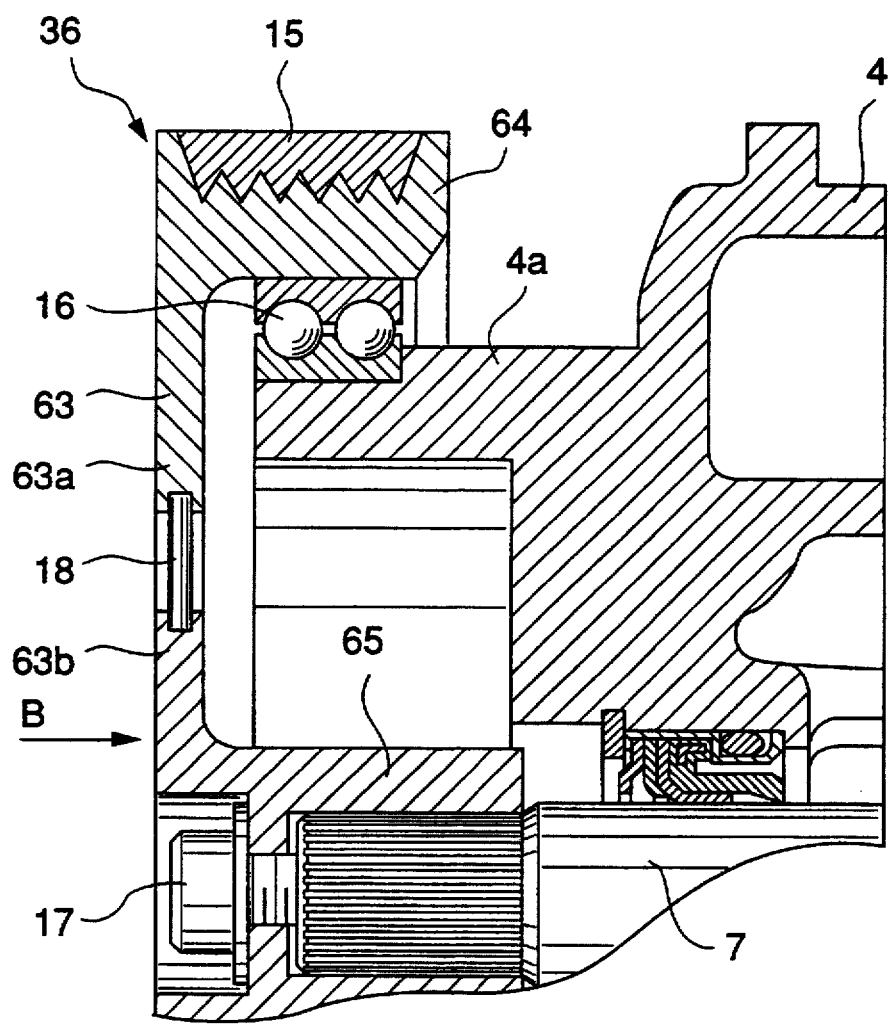
FIG. 5 is an enlarged sectional view showing part of a swash plate refrigerant compressor according to a variation of the first embodiment.
Figure 6:
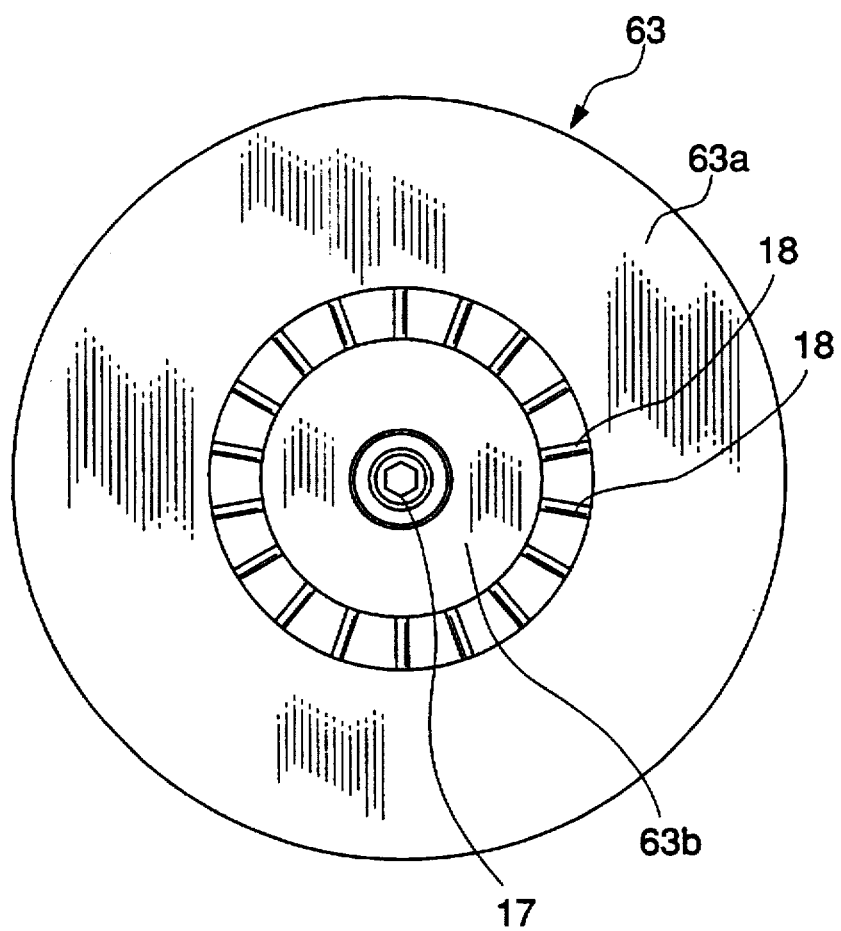
FIG. 6 is an end view of a pulley, as seen in the direction of arrow B in FIG. 5.

FIG. 5 shows part of a swash plate refrigerant compressor according to a variation of the first embodiment on an enlarged scale, and FIG. 6 shows an end face of a pulley 36 appearing in FIG. 5 as viewed from a direction indicated by an arrow B in FIG. 5. Component parts and elements corresponding to those of the first embodiment are indicated by identical reference numerals, and description thereof is omitted.

This variation is distinguished from the first embodiment, in which the groove 33b is formed on the front head-side end face of the disk 33 of the pulley 14 along the imaginary circle about the drive shaft 7, in that a disk 63 of the pulley 36 is formed of the separate parts of an outer disk 63a formed in one piece with a rim 64 and an inner disk 63b formed in one piece with a boss 65, with the outer disk 63a and the inner disk 63b being connected by means of a plurality of breakaway bridges 18 formed of a resilient material, such as a rubber.

The thickness of each breakaway bridge 18 is set to a value as will permit the breakaway bridges 18 to break when a load torque larger than a predetermined value is applied thereto.

According to the variation of the first embodiment, the same effects as obtained by the first embodiment can be obtained and further, vibrations of the drive shaft due to variation in the load on compression of refrigerant gas become hard to be transmitted to the belt 15, whereby it is possible to suppress adverse effects of irregular tensions of the belt 15 on the other auxiliary machines, which reduces noise generated by the vehicle.

Figure 7:
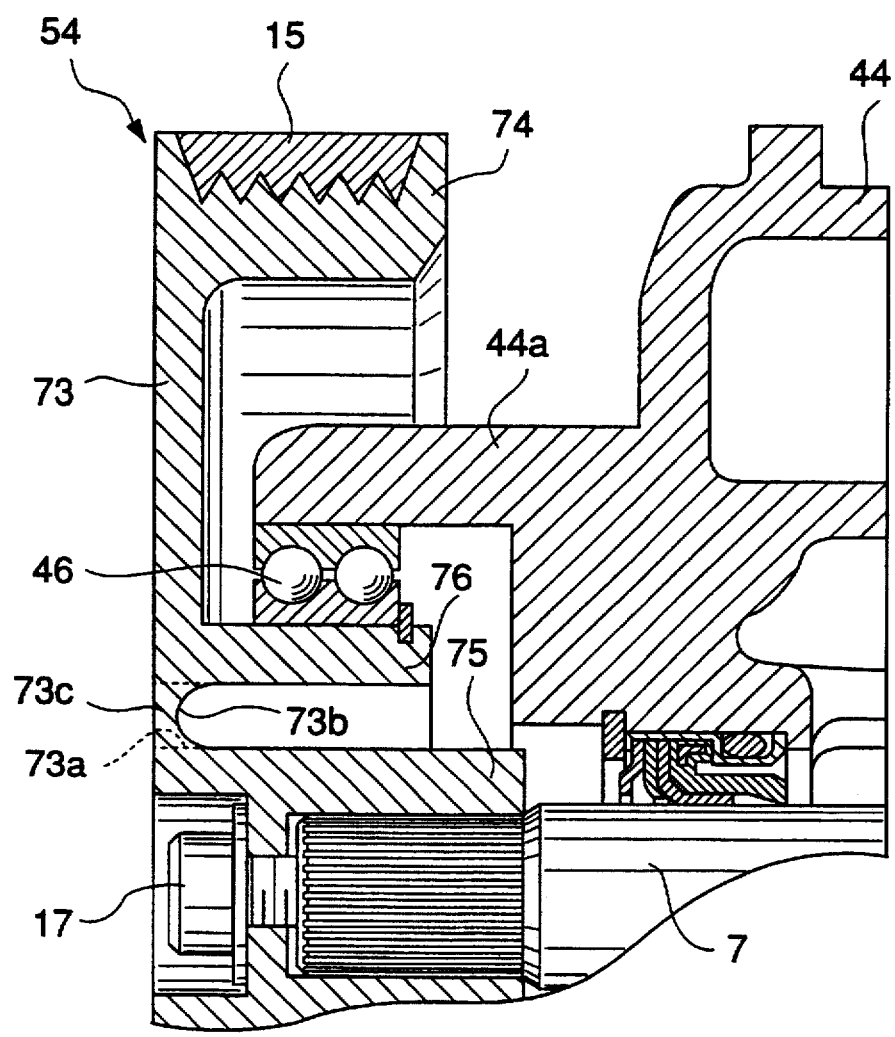
FIG. 7 is an enlarged sectional view showing part of a swash plate refrigerant compressor according to a second embodiment.

FIG. 7 shows part of a swash plate refrigerant compressor according to a second embodiment of the invention on an enlarged scale. Component parts and elements corresponding to those of the first embodiment are indicated by identical reference numerals, and description thereof is omitted.

This variation is distinguished from the first embodiment, in which the pulley 14 is formed by the disk 33, the rim 34 and the boss 35, in that a pulley 54 is formed of a disk 73, a rim 74, a boss 75, and a hollow cylindrical part 76 formed in one piece with the disk 73.

A groove 73b is formed on a front head-side end face of the disk 73 along the outer periphery of the boss 75, and a plurality of slots 73a are formed in the groove 73b by press forming to form breakaway portions 73c each between adjacent ones of the slots 73a. The thickness of each breakaway portion 73c (or depth of the groove 73b) is set to a value which will permit the breakaway portions 73c to break when a load torque larger than a predetermined value is applied thereto.

The hollow cylindrical part 76 is concentric with the boss 75, and the inner diameter of the hollow cylindrical part 76 is substantially equal to the sum of the outer diameter of the boss 75 and the radial width of the groove 73b.

A radial bearing 46 is arranged between the outer peripheral surface of the hollow cylindrical part 76 and the inner peripheral surface of the boss 44a of the front head 44.

According to the swash plate refrigerant compressor of the second embodiment, it is possible to obtain the same effects as obtained by the first embodiment, and since the hollow cylindrical part 76 is formed in one piece with the disk 73, the radial bearing 46 which is smaller in diameter than the bearing 16 used in the first embodiment can be employed as the bearing, and further, the circumferential speed of the radial bearing 46 is smaller than that of the bearing 16 of the first embodiment, which makes it possible to reduce the cost of the compressor as well an increase the durability of the radial bearing.

Figure 8:
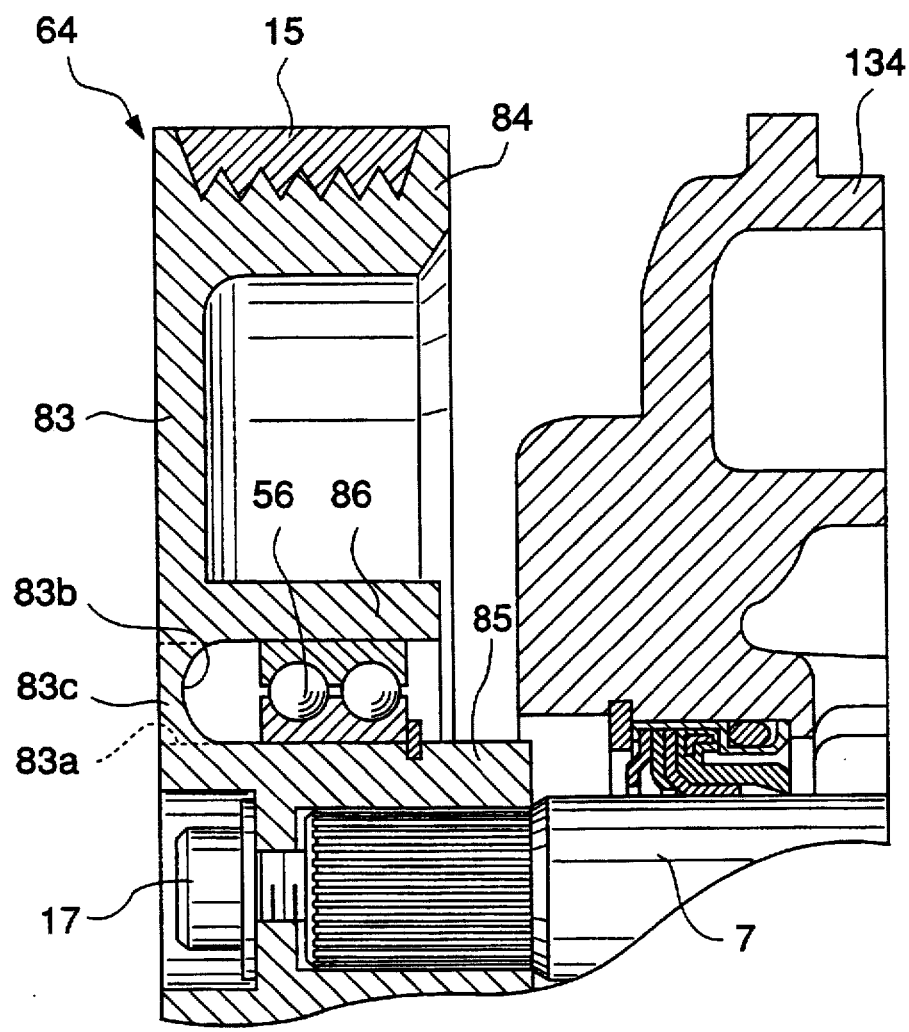
FIG. 8 is an enlarged sectional view showing part of a swash plate refrigerant compressor according to a third embodiment.

FIG. 8 shows part of a swash plate refrigerant compressor according to a third embodiment of the invention on an enlarged scale. Component parts and elements corresponding to those of the preceding embodiments are indicated by identical reference numerals, and description thereof is omitted.

This embodiment is distinguished from the second embodiment, in which the radial bearing 46 is arranged between the outer peripheral surface of the hollow cylindrical part 76 of the pulley 54 and the inner peripheral surface of the boss 44a of the front head 44, in that a radial bearing 56 is arranged between an inner peripheral surface of a hollow cylindrical part 86 of a pulley 64 and an outer peripheral surface of a boss 85 of the pulley 64.

This embodiment is similar in construction to the second embodiment shown in FIG. 7 in that a groove 83b is formed on a front head-side end face of the disk 83 along the outer peripheral surface of the boss 85, with a plurality of slots 83a being formed by press forming in the groove 83b to form breakaway portions 83c each between adjacent ones of the slots 83a, 83a, the thickness of each breakaway portion 83c (or depth of the groove 83b) being set to a value which will permit the breakaway portions 83c to break when a load torque larger than a predetermined value is applied thereto, and the hollow cylindrical part 86 is concentric with the boss 85 with the inner peripheral surface of the hollow cylindrical part 86 and the outer peripheral surface of the boss 85 being spaced by a distance equal to the radial width of the groove 83b.

According to the swash plate refrigerant compressor of the third embodiment, it is possible to obtain the same effects as obtained by the first embodiment, and since the radial bearing 56 is arranged between the inner peripheral surface of the hollow cylindrical part 86 of the pulley 64 and the outer peripheral surface of the boss 85 of the pulley 64, normally, the radial bearing 56 does not perform its function but it starts to operate only after the breakaway portions 83c have broken. Further, it is possible to use a radial bearing which is even smaller in diameter than the radial bearing 46 of the second embodiment, so that the circumferential speed of the radial bearing 56 is even smaller than that of the bearing 46 of the second embodiment. Therefore, it is possible to employ a radial bearing (e.g. a single row ball bearing, a needle bearing, or a plane bearing) which is lower in grade than the illustrated double-row ball bearing (radial bearing 56), which contributes to reduction of manufacturing costs of the compressor.

Although in the first to third embodiments, to form the breakaway portions 33c, 73c, 83c, the groove 33b, 73b, 83b is provided on the front head-side end face of the disk 33, 73, 83 of the pulley 14, 54, 64 along the imaginary circle about the drive shaft 7, and a plurality of slots 33a, 73a, 83a are formed in the groove 33b, 73b, 83b, this is not limitative, but instead, as variations of the first to third embodiments, a breakaway portion may be formed by forming the groove 33b, 73b, 83b along the imaginary circle with the depth of the groove 33b, 73b, 83b (or the thickness of the breakaway portion 33c) being set to a value which will permit the breakaway portion to break when a load torque larger than a predetermined value acts thereon, or alternatively, breakaway portions may be formed by forming a plurality of slots 33a, 73a, 83a along the imaginary circle with the distance between adjacent ones of the slots 33a, 73a, 83a being set to a value which will permit the breakaway portions to break when a load torque larger than a predetermined value is applied to the breakaway portions. According to these variations, it is possible to obtain the same effects as obtained by the first to third embodiments.

Figure 9:
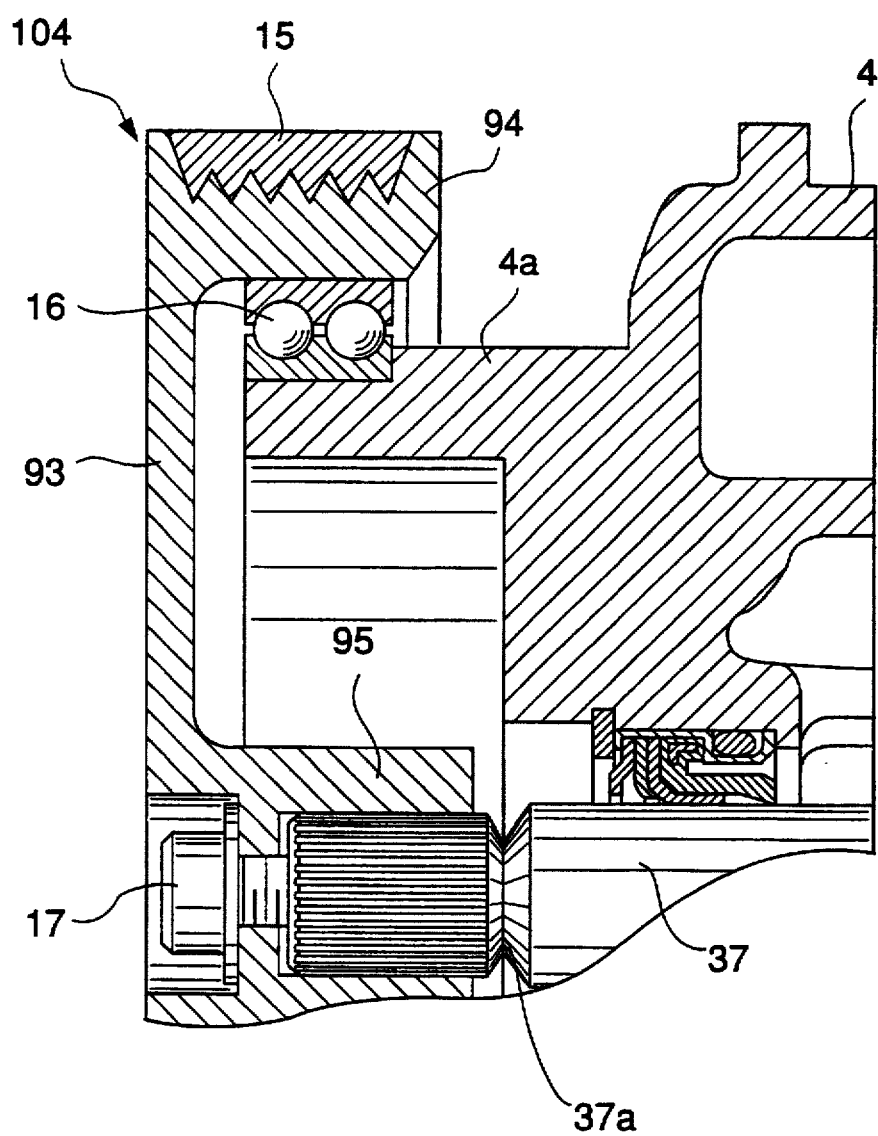
FIG. 9 is an enlarged sectional view showing part of a swash plate refrigerant compressor according to a fourth embodiment.

FIG. 9 shows part of a swash plate refrigerant compressor according to a fourth embodiment of the invention on an enlarged scale. Component parts and elements corresponding to those of the preceding embodiments are indicated by identical reference numerals, and description thereof is omitted.

This embodiment is distinguished from the preceding embodiments, in which the disks 33, 63, 73, and 83 are formed with the breakaway portions 33c, 18, 63c, 73c, and 83c, respectively, in that as shown in FIG. 9, a neck (reduced-diameter portion) 37a is provided in a drive shaft 37 as a breakaway portion.

The depth of the neck 37a or the diameter of the smallest diameter portion of the neck 37a is set to a value which will permit the neck 37a to break when a load torque larger than a predetermined value is applied thereto.

According to the swash plate refrigerant compressor of the fourth embodiment, when the drive shaft 7 is disabled from rotation so that a load torque in excess of the predetermined value is applied to the neck 37a, the neck 37a breaks to divide the drive shaft 37 into two parts, whereby the belt 15 is disconnected from the swash plate 8. On the other hand, since the rim 94 of the pulley 104 is rotatably supported on the outer peripheral surface of the boss 4a of the front head 4 via the radial bearing 16, the pulley 104 can freely rotate after the neck 37a has broken due to the drive shaft 37 being disabled from rotation.

According to the swash plate refrigerant compressor of the fourth embodiment, it is possible to obtain the same effects as obtained by the first embodiment. Further, since the pulley 104 is not damaged, it can be used again, which contributes to reduction of the cost of replacement of the compressor.

Figure 10:
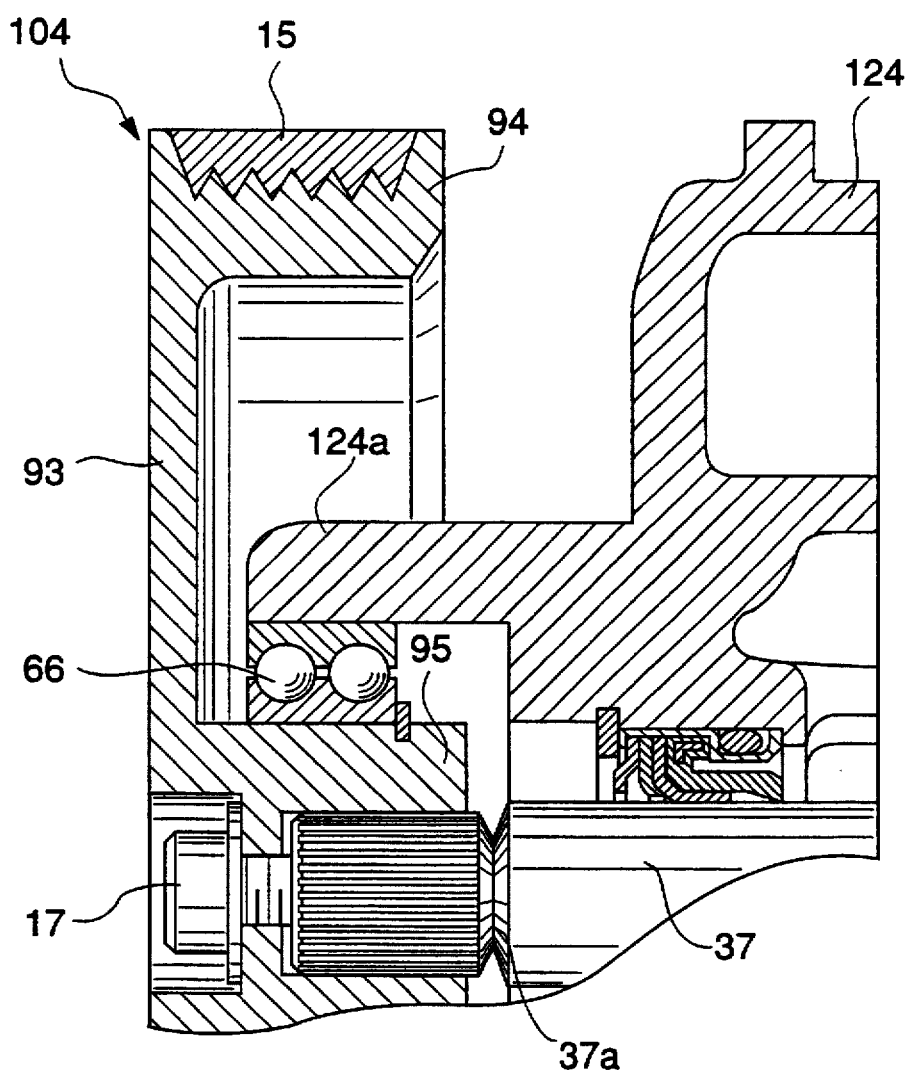
FIG. 10 is an enlarged sectional view showing part of a swash plate refrigerant compressor according to a variation of the fourth embodiment.

FIG. 10 shows part of a swash plate refrigerant compressor according to a variation of the fourth embodiment on an enlarged scale. Component parts and elements corresponding to those of the preceding embodiments are indicated by identical reference numerals, and description thereof is omitted.

This variation is distinguished from the fourth embodiment, in which the radial bearing 16 is arranged between the inner peripheral surface of the rim 94 of the pulley 104 and the outer peripheral surface of the boss 4a of the front head 4, in that as shown in FIG. 10, a radial bearing 66 is arranged between an inner peripheral surface of a boss 124a of a front head 124 and an outer peripheral surface of a boss 95 of the pulley 104.

According to the swash plate refrigerant compressor of the fourth embodiment, it is possible to obtain the same effects as obtained by the fourth embodiment, and further, it is possible to use the radial bearing 66, which is smaller in diameter than the radial bearing 16 of the fourth embodiment, so that the circumferential speed of the radial bearing 66 is reduced to improve the durability of the radial bearing or prolong the life thereof.

Although in the above embodiments and variations, description is made of cases in which the invention is applied to a swash plate compressor, this is not limitative, but the invention may be applied to other types of refrigerant compressors, such as a wobble plate compressor and a vane compressor.

What is claimed is:

1. A refrigerant compressor comprising:
    a drive shaft;
    a pulley fixedly fitted on said drive shaft, over which is passed a torque-transmitting member for transmitting torque from an external drive source to said drive shaft;
    a compression rotational member mounted on said drive shaft for rotation in unison with said drive shaft to enable compression of a refrigerant gas;
    said pulley having a rim in the form of a hollow cylinder, over which is passed said torque-transmitting member; a boss which is fixedly fitted on said drive shaft; and a support member connecting said rim and said boss; said rim, boss and support member being a unitary, integrally formed one-piece member;
    a breakaway portion provided in said support member for breaking to disconnect said torque-transmitting member from said compression rotational member when a load torque larger than a predetermined value is applied to said breakaway portion; and
    a bearing arranged on said pulley for receiving tension of said torque-transmitting member to thereby hold said rim in a rotating state when said torque-transmitting member is disconnected from said compression rotational member by breaking of said breakaway portion; and
    wherein:
        said support member of said pulley is in the form of a disk; and
        said breakaway portion comprises a plurality of through holes in said support member of said pulley, said through holes being arranged along an imaginary circle about said drive shaft, and said through holes being arranged at predetermined spaced intervals along said imaginary circle.

2. A refrigerant compressor according to claim 1, wherein each of said plurality of through holes is a slot extending along said imaginary circle.

3. A refrigerant compressor comprising:
    a drive shaft;
    a pulley fixedly fitted on said drive shaft, over which is passed a torque-transmitting member for transmitting torque from an external drive source to said drive shaft;
    a compression rotational member mounted on said drive shaft for rotation in unison with said drive shaft to enable compression of a refrigerant gas;
    said pulley having a rim in the form of a hollow cylinder, over which is passed said torque-transmitting member; a boss which is fixedly fitted on said drive shaft; and a support member connecting said rim and said boss; said rim, boss and support member being a unitary, integrally formed one-piece member;
    a breakaway portion provided in said support member for breaking to disconnect said torque-transmitting member from said compression rotational member when a load torque larger than a predetermined value is applied to said breakaway portion; and
    a bearing arranged on said pulley for receiving tension of said torque-transmitting member to thereby hold said rim in a rotating state when said torque-transmitting member is disconnected from said compression rotational member by breaking of said breakaway portion; and
    wherein said support member of said pulley is in the form of a disk, and said breakaway portion comprises an annular groove on said support member of said pulley, said annular groove extending along an imaginary circle about said drive shaft.

4. A refrigerant compressor comprising:
    a drive shaft;
    a pulley fixedly fitted on said drive shaft, over which is passed a torque-transmitting member for transmitting torque from an external drive source to said drive shaft;
    a compression rotational member mounted on said drive shaft for rotation in unison with said drive shaft to enable compression of a refrigerant gas;
    said pulley having a rim in the form of a hollow cylinder, over which is passed said torque-transmitting member; a boss which is fixedly fitted on said drive shaft; and a support member connecting said rim and said boss;
    a breakaway portion provided in said support member for breaking to disconnect said torque-transmitting member from said compression rotational member when a load torque larger than a predetermined value is applied to said breakaway portion; and
    a bearing arranged on said pulley for receiving tension of said torque-transmitting member to thereby hold said rim in a rotating state when said torque-transmitting member is disconnected from said compression rotational member by breaking of said breakaway portion; and
    wherein:
        said support member of said pulley is in the form of a disk; and
        said breakaway portion comprises an annular groove on said support member of said pulley, said annular groove extending along an imaginary circle about said drive shaft; and a plurality of through holes in said annular groove, said through holes being arranged at predetermined spaced intervals.

5. A refrigerant compressor according to claim 4, wherein each of said plurality of through holes is in the form of a slot extending along said imaginary circle.

6. A refrigerant compressor comprising:
    a drive shaft;
    a pulley fixedly fitted on said drive shaft, over which is passed a torque-transmitting member for transmitting torque from an external drive source to said drive shaft;

a compression rotational member mounted on said drive shaft for rotation in unison with said drive shaft to enable compression of a refrigerant gas;

said pulley having a rim in the form of a hollow cylinder, over which is passed said torque-transmitting member; a boss which is fixedly fitted on said drive shaft; a support member connecting said rim and said boss;

a breakaway portion provided in said support member for breaking to disconnect said torque-transmitting member from said compression rotational member when a load torque larger than a predetermined value is applied to said breakaway portion; and a bearing arranged on said pulley for receiving tension of said torque-transmitting member to thereby hold said rim in a rotating state when said torque-transmitting member is disconnected from said compression rotational member by breaking of said breakaway portion; and wherein:
said support member of said pulley comprises a rim-side plate part formed in one piece with said rim, and a boss-side plate part formed in one piece with said boss; and said breakaway portion is formed of a resilient, breakable, material which connects said rim-side plate part to said boss-side plate part.

7. A refrigerant compressor according to any one of claims 1, 2, 3, 4, 5 or 6, wherein:
said refrigerant compressor further comprises a compressor casing having a boss facing toward said pulley; and
said bearing is arranged between an inner peripheral surface of said rim and an outer peripheral surface of said boss of said compressor casing.

8. A refrigerant compressor according to any one of claims 1, 2, 3, 4, 5 or 6, wherein:
said refrigerant compressor further comprises a compressor casing having a boss facing toward said pulley;
said support member of said pulley has a hollow cylindrical part formed outward of said imaginary circle and concentric with said boss of said pulley; and
said bearing is arranged between an inner peripheral surface of said boss of said compressor casing and an outer peripheral surface of said hollow cylindrical part of said support member of said pulley.

9. A refrigerant compressor according to any one of claims 1, 2, 3, 4, 5 or 6, wherein:
said support member of said pulley has a hollow cylindrical part formed radially outward of said imaginary circle and concentric with said boss of said pulley; and
said bearing is arranged between an inner peripheral surface of said hollow cylindrical part of said support member of said pulley and an outer peripheral surface of said boss of said pulley.

10. A refrigerant compressor comprising:
a drive shaft;
a pulley fixedly fitted on said drive shaft, over which is passed a torque-transmitting member for transmitting torque from an external drive source to said drive shaft;
a compression rotational member mounted on said drive shaft for rotation in unison with said drive shaft to enable compression of a refrigerant gas;
said pulley having a rim in the form of a hollow cylinder, over which is passed said torque-transmitting member; a boss which is fixedly fitted on said drive shaft; and a support member connecting said rim and said boss;
a breakaway portion provided in said drive shaft for breaking to disconnect said torque-transmitting member from said compression rotational member when a load torque larger than a predetermined value is applied to said breakaway portion; and a bearing arranged on said pulley for receiving tension of said torque-transmitting member to thereby hold said rim in a rotating state when said torque-transmitting member is disconnected from said compression rotational member by breaking of said breakaway portion.

11. A refrigerant compressor according to claim 10, wherein said breakaway portion comprises a neck portion formed in a pulley-side end of said drive shaft.

12. A refrigerant compressor according to claim 10 or 11, wherein:
said refrigerant compressor further comprises a compressor casing having a boss facing toward said pulley: and
said bearing is arranged between an inner peripheral surface of said boss of said compressor casing and an outer peripheral surface of said boss of said pulley.

13. A refrigerant compressor according to claim 10 or 11, wherein:
said refrigerant compressor further comprises a compressor casing having a boss facing toward said pulley; and
said bearing is arranged between an inner peripheral surface of said rim and an outer peripheral surface of said boss of said compressor casing.

14. A refrigerant compressor comprising:
a drive shaft;
a pulley fixedly fitted on said drive shaft, over which is passed a torque-transmitting member for transmitting torque from an external drive source to said drive shaft;
a compression rotational member mounted on said drive shaft for rotation in unison with said drive shaft to enable compression of a refrigerant gas;
said pulley having a rim in the form of a hollow cylinder, over which is passed said torque-transmitting member; a boss which is fixedly fitted on said drive shaft; and a support member connecting said rim and said boss;
a breakaway portion provided in said support member for breaking to disconnect said torque-transmitting member from said compression rotational member when a load torque larger than a predetermined value is applied to said breakaway portion;
a bearing arranged on said pulley for receiving tension of said torque-transmitting member to thereby hold said rim in a rotating state when said torque-transmitting member is disconnected from said compression rotational member by breaking of said breakaway portion; and
a compressor casing having a boss facing toward said pulley;
wherein:
said support member of said pulley has a hollow cylindrical part formed outward of said imaginary circle and concentric with said boss of said pulley; and
said bearing is arranged between an inner peripheral surface of said boss of said compressor casing and an outer peripheral surface of said hollow cylindrical part of said support member of said pulley.

15. A refrigerant compressor comprising:
a drive shaft;
a pulley fixedly fitted on said drive shaft, over which is passed a torque-transmitting member for transmitting torque from an external drive source to said drive shaft;
a compression rotational member mounted on said drive shaft for rotation in unison with said drive shaft to enable compression of a refrigerant gas;

said pulley having a rim in the form of a hollow cylinder, over which is passed said torque-transmitting member; a boss which is fixedly fitted on said drive shaft; and a support member connecting said rim and said boss;

a breakaway portion provided in said support member for breaking to disconnect said torque-transmitting member from said compression rotational member when a load torque larger than a predetermined value is applied to said breakaway portion;

a bearing arranged on said pulley for receiving tension of said torque-transmitting member to thereby hold said rim in a rotating state when said torque-transmitting member is disconnected from said compression rotational member by breaking of said breakaway portion; and a compressor casing having a boss facing toward said pulley;

wherein:

said support member of said pulley has a hollow cylindrical part formed radially outward of said imaginary circle and concentric with said boss of said pulley, and radially inward of an inner surface of said rim of said pulley; and said bearing is arranged between an inner peripheral surface of said hollow cylindrical part of said support member of said pulley and an outer peripheral surface of said boss of said pulley.

* * * * *